(12) United States Patent
Fischer et al.

(10) Patent No.: US 8,449,244 B2
(45) Date of Patent: May 28, 2013

(54) METHOD FOR OPERATING A WIND ENERGY CONVERTER, CONTROL DEVICE FOR A WIND ENERGY CONVERTER, AND WIND ENERGY CONVERTER

(75) Inventors: Martin Fischer, Klagenfurt (AT); Peter Weichbold, Klagenfurt (AT); Robert Tratnig, St. Margareten (AT)

(73) Assignee: AMSC Austria GmbH, Klagenfurt am Wörthersee (AT)

( * ) Notice: Subject to any disclaimer, the term of this patent is extended or adjusted under 35 U.S.C. 154(b) by 0 days.

(21) Appl. No.: 12/527,952

(22) PCT Filed: Mar. 20, 2009

(86) PCT No.: PCT/EP2009/053302
§ 371 (c)(1),
(2), (4) Date: Oct. 15, 2009

(87) PCT Pub. No.: WO2010/105692
PCT Pub. Date: Sep. 23, 2010

(65) Prior Publication Data
US 2011/0318180 A1    Dec. 29, 2011

(51) Int. Cl.
*F03D 7/02*    (2006.01)
(52) U.S. Cl.
USPC ................................. 415/41; 290/44

(58) Field of Classification Search
USPC .............................. 416/1, 41; 290/1 C, 44, 55
See application file for complete search history.

(56) References Cited

FOREIGN PATENT DOCUMENTS

| EP | 1895158 | 3/2008 |
|---|---|---|
| EP | 1631758 | 5/2008 |
| WO | 2008/061263 | 5/2008 |
| WO | WO 2008/149109 | 12/2008 |

*Primary Examiner* — Dwayne J White
(74) *Attorney, Agent, or Firm* — Occhiuti Rohlicek & Tsao LLP (57) ABSTRACT

Some general aspects of the invention provide a method for operating a wind energy converter having a variable-ratio gear system mechanically coupled between a rotor and a generator, wherein the variable-ratio gear system includes a first hydraulic unit coupled to a first shaft and a second hydraulic unit coupled to a second shaft. The method comprises adjusting the variable-ratio gear system to a first gear ratio at which the first shaft substantially does not rotate; determining a wind speed or a related parameter (n, P, p); detecting whether the wind speed or the related parameter (n, P, p) has crossed a first threshold value in a first direction; and adjusting the variable-ratio gear system, when the wind speed or the related parameter (n, P, p) has crossed the first threshold value in the first direction, to a second gear ratio at which the second shaft substantially does not rotate.

19 Claims, 4 Drawing Sheets

METHOD FOR OPERATING A WIND ENERGY CONVERTER, CONTROL DEVICE FOR A WIND ENERGY CONVERTER, AND WIND ENERGY CONVERTER

CROSS-REFERENCE TO RELATED APPLICATIONS

This application is the National Stage of International Application No. PCT/EP2009/053301, filed on Mar. 20, 2009, the content of which is hereby incorporated by reference in its entirety.

BACKGROUND

Method for operating a wind energy converter, control device for a wind energy converter, and wind energy converter.

The present invention relates to a wind energy converter.

Wind energy can be converted into useful forms, such as electricity, by a wind energy converter that includes a rotor, e.g. a low-speed propeller, coupled to a generator. Since the speed of wind at a given location in general fluctuates with changing weather conditions, conventional wind energy converters are typically operated with variable rotor speed in order to achieve a high aerodynamic efficiency of the rotor at different levels of wind speed.

In some implementations, to supply electricity into an electric power grid, it is advantageous to use a constant-speed generator such as a synchronous generator directly connected to the grid for power transmission. In addition to economic benefits, the quality of the electric power fed into the grid is usually higher without a power converter, which can be expensive. Furthermore, the constant speed generator can be operated at a medium voltage level such that no additional transformer is needed.

DE 10 2005 054 539 B3 discloses one example of a wind energy converter including a rotor and an electrical generator for direct connection to an electric power grid. In this example, the rotor and the generator are coupled by a variable-ratio gear system that includes a hydraulic component for controlling the gear ratio of the variable-ratio gear system. As a result, the wind energy converter operates at a variable rotor speed according to the speed of wind while driving the generator at a constant speed.

In the above example, while aerodynamic losses of the wind energy converter can be reduced by adjusting the rotor speed to changes in the speed of wind, a substantial portion of the power is transported from the rotor to the generator via the hydraulic component of the variable-ratio gear system. As hydraulic components generally suffer power losses by leakage flow, friction losses etc., the overall efficiency of the wind energy converter is reduced due to the power losses in the hydraulic component of the variable-ratio gear system.

SUMMARY

One general aspect of the invention relates to a method for operating a wind energy converter that has a variable-ratio gear system mechanically coupled between a rotor and a generator, wherein the variable-ratio gear system includes a first transmission unit, e.g. a hydraulic unit, coupled to a first shaft, and a second transmission unit, e.g. a hydraulic unit, coupled to a second shaft. The method includes adjusting the variable-ratio gear to a first gear ratio at which the first shaft substantially does not rotate. For example, the first shaft does not rotate at all or rotates at a rotational speed that is negligibly low compared to a range of rotational speeds at which the first shaft rotates when the gear ratio of the variable-ratio gear system is varied over a range of gear ratios, assuming a constant generator speed.

Embodiments of this method may include one or more of the following features.

A wind speed is determined. For example, a wind-speed value that characterises a current wind speed is determined directly from wind measurement or indirectly from operating parameters of the wind energy converter. Further, the method also includes detecting whether the wind speed has crossed a first threshold value in a first direction. For example, the first direction may be predefined as the direction corresponding to a rise in wind speed, such that a detection that the wind speed has crossed the first threshold value occurs when the wind speed has risen beyond, i.e. has become greater than the first threshold value. Alternatively, the first direction may be predefined as the direction corresponding to a decrease in wind speed, such that a detection that the wind speed has crossed the first threshold value occurs when the wind speed has fallen below, i.e. has become less than the first threshold value.

In some embodiments, when it is determined that the wind speed has crossed the first threshold value in the first direction, the variable-ratio gear system is adjusted to a second gear ratio at which the second shaft substantially does not rotate. In this event the rotational speed of the second shaft is equal to zero, for example, or is negligibly low when compared to a range of rotational speeds at which the second shaft rotates when the gear ratio of the variable-ratio gear system is varied over the range of gear ratios of the variable-ratio gear, assuming a constant generator speed.

Using the above method, the gear ratio of the variable-ratio gear system is changed from a first gear ratio at which the first shaft coupled to the first hydraulic unit substantially does not rotate to a second gear ratio at which the second shaft coupled to the second hydraulic unit substantially does not rotate. In this way, gear ratios at which both the first and the second shaft are in substantial rotation are avoided, thus reducing energy loss in the hydraulic units, which typically is greater for higher rotational speeds of the shafts coupled to the hydraulic units. Therefore, the method enables to operate a wind energy converter having a variable-ratio gear system that includes a hydraulic component in such a way that the energy loss in the hydraulic units and thereby in the variable-ratio gear system as a whole is significantly reduced while the rotor is still able to operate at different rotor speeds in accordance with varying wind conditions.

The method can further include driving the generator at a constant generator speed. This allows a synchronous generator to be directly connected to a power grid, without necessarily requiring the use of a power converter that can be both expensive and energy inefficient. In some embodiments, at least one of the first gear ratio and the second gear ratio corresponds to one of a minimum operational speed and a nominal maximum speed of the rotor, when the generator is driven at the constant generator speed. In this way, the lower and/or upper limits of the operational range of physically possible rotor speeds of the wind energy converter can be utilised, thus enabling high efficiency over a particularly wide range of wind speeds by utilising the physical capabilities of the rotor to the respective limit(s).

In some embodiments, the method further includes uncoupling the first shaft from the first hydraulic unit, when the wind speed has crossed the first threshold value in the first direction. In this situation, as the second shaft, which is coupled to the second hydraulic unit, substantially does not rotate, substantially no power is transmitted hydraulically or mechanically between the first and second hydraulic units. By uncoupling the first shaft from the first hydraulic unit, further power transmission between the first shaft and the first hydraulic unit is disabled, enabling the first hydraulic unit to decelerate to zero speed e.g. by its own friction. In this way, both the first and second hydraulic units are configured to operate at zero speed, thus further reducing hydraulic losses in the variable-ratio gear system and achieving a particularly high efficiency of the wind energy converter.

In some embodiments, the method further includes braking the first hydraulic unit when the wind speed has crossed the first threshold value in the first direction. This can advantageously increase the operational stability of the wind energy converter in this operational state and can further ease the load on the first hydraulic unit for increasing the life span of the hydraulic unit.

In some embodiments, when the wind speed has crossed the first threshold value in the first direction, a swivel angle of the first hydraulic unit is adjusted so that a hydraulic flow through the first hydraulic unit is substantially stopped. This effectively stops hydraulic power flow between the first and second hydraulic units, such that the braking of the first hydraulic unit enables to indirectly brake the second hydraulic unit, too, or to dampen the second hydraulic unit, depending on a swivel angle setting of the second hydraulic unit. This can improve the operational stability of the wind energy converter in this operational state.

In some embodiments, the first and second hydraulic units are connected by at least one hydraulic conduit. The method further includes blocking at least one hydraulic conduit when the wind speed has crossed the first threshold value in the first direction. This also stops hydraulic power flow between the first and second hydraulic units, and indirectly brakes or dampens the second hydraulic unit for improving the operational stability of the wind energy converter in this operational state. Furthermore, the hydraulic load on the first hydraulic unit is eased, resulting in an increase in the hydraulic unit's life span.

In some embodiments, at least one hydraulic conduit is interconnected by a bypass, and the method further includes regulating the bypass when the wind speed has crossed the first threshold value in the first direction. For example, the bypass may be initially closed and then be opened when the wind speed has crossed the first threshold value in the first direction. This enables to control the damping of the second hydraulic unit while reducing hydraulic load on the first hydraulic unit for increasing its life span.

In some embodiments, the method further includes detecting whether the wind speed has crossed a second threshold value opposite to the first direction, and if so, adjusting the variable-ratio gear system to the first gear ratio. In this way, gear ratios other than the first and second gear ratio are avoided for both cases of rising and falling wind speed, thereby reducing power losses for achieving a particularly high overall efficiency.

In some embodiments, the second shaft is uncoupled from the second hydraulic unit when the wind speed has crossed the second threshold value inversely to the first direction for achieving benefits analogous to those achieved by the uncoupling of the first hydraulic unit. Similarly, the second hydraulic unit is braked when the wind speed has crossed the second threshold value inversely to the first direction for achieving benefits analogous to those achieved by the braking of the first hydraulic unit. Another general aspect of the invention provides a system and a method for improving the energy efficiency of a wind energy converter having a first and a second active module. The system includes a sensor system for obtaining a measurement of a wind condition (for example, a local wind speed). A controller is coupled to the sensor system for determining, according to the obtained measurement, whether a pre-determined operational condition is satisfied. Based on a result of the determination, the controller generates a signal for adjusting a configuration of a selected one of the first and the second active module to achieve a predetermined power characteristic of the wind energy converter.

Embodiments of this aspect may include one or more of the following features.

Using the obtained measurement, the controller determines whether a first or a second operational condition is satisfied and according to the result, generates a signal for adjust the configuration of a corresponding one of the first and second active modules.

For example, when a magnitude of the obtained measurement has crossed a first threshold value in a first direction, the controller determines that the first operational condition is satisfied and subsequently generates a signal for adjusting the configuration of the first active module. Similarly, when the magnitude of the obtained measurement has crossed a second threshold value in a second direction opposite to the first direction, the controller determines that the second operational condition is satisfied and subsequently generates a signal for adjusting the configuration of the second active module.

The systems and methods described herein provide significant advantages over the known prior art. By operating the variable-ratio gear system in such a way that at least one of the transmission units, e.g. hydraulic units, is at or close to zero speed, the transmission of power through the hydraulic units can be significantly reduced. The above-mentioned advantages can also help to increase the efficiency of energy conversion of the wind energy converter, to reduce noise emissions from the hydraulic units, and furthermore to reduce cost including maintenance cost by increasing the lifespan of the hydraulic units.

Other features and advantages are illustrated in the accompanying drawings and described in detail in the following part of the description.

FIGURES

In the Figures.

Throughout the figures the same reference numbers indicate the same or functionally equivalent means.

DETAILED DESCRIPTION

Figure 1:
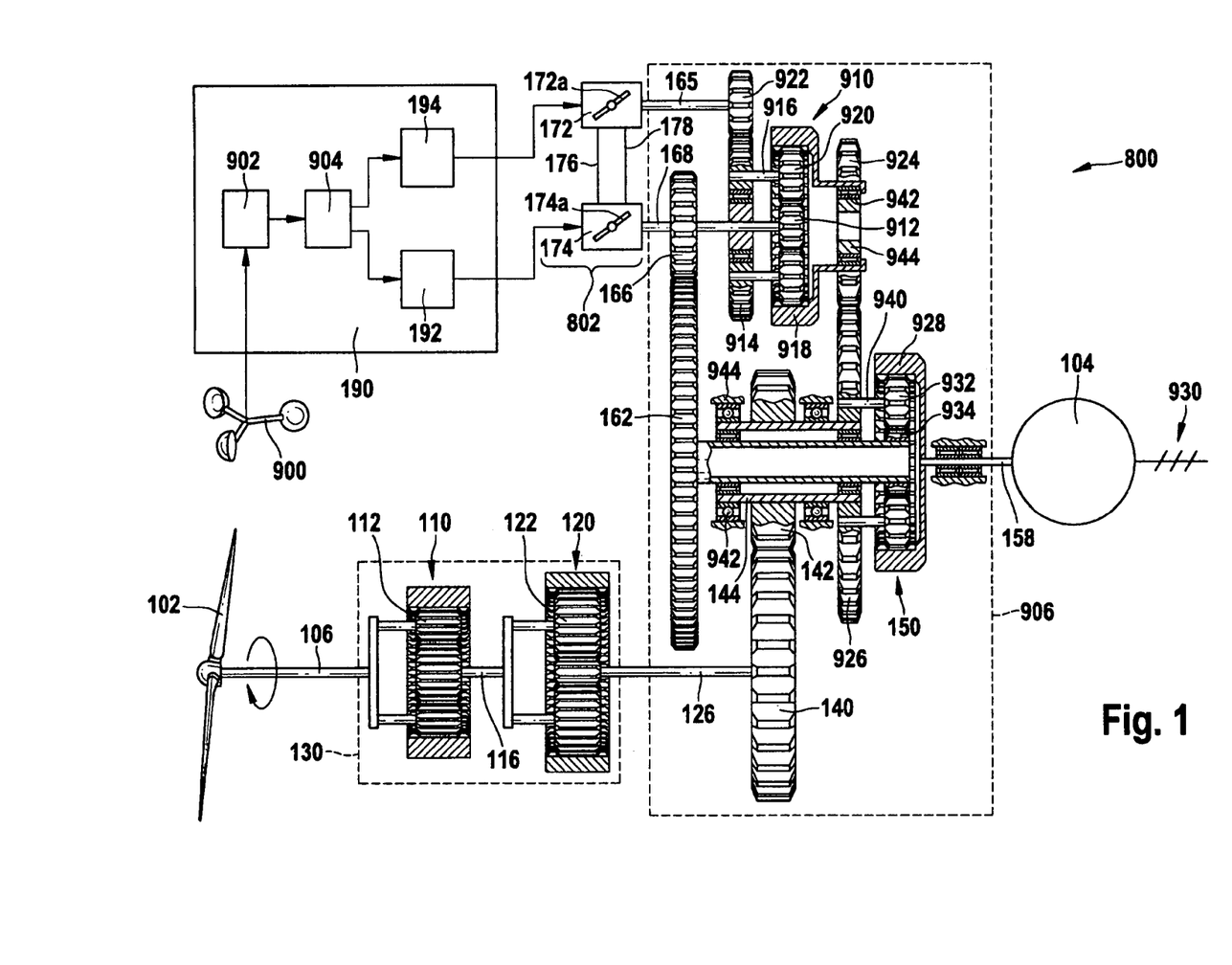
FIG. 1 is a schematic illustration of a wind energy converter according to an embodiment of the invention, the wind energy converter having a variable-ratio gear system including a first hydraulic unit coupled to a first shaft and a second hydraulic unit coupled to a second shaft.

FIG. 1 is a schematic illustration of a wind energy converter 800, which includes a control device 190 configured for improving the energy efficiency of wind energy converter 800. Prior to describing the control device 190 in detail, the following section first discusses the structure and the operation of the wind energy converter 800.

As shown in FIG. 1, the wind energy converter 800 includes a rotor 102 (e.g. a low speed propeller) that drives a generator 104 (preferably a constant speed synchronous generator) through a gear train 130, 906, 802. The gear train 130, 906, 802 includes a constant-ratio gear box 130 and a variable-ratio gear system 906, 802 the gear ratio of which is controllable by the control device 190. In this description, the gear ratio of the variable-ratio gear system 906, 802 corresponds to, or is defined in association with, the ratio between the rotational speeds at the input terminal (shaft 126) and the output terminal (shaft 158) of the variable-ratio gear system 906, 802.

The rotor 102 is connected to the constant-ratio gearbox 130 through a rotor shaft 106. The constant-ratio gearbox 130 is configured to transfer power from the low speed, high torque rotor shaft 106 to a high speed, low torque interconnecting shaft 126. Purely as an example, the constant ratio gearbox 130 is shown to include a first epicyclic gearing 110 and a second epicyclic gearing 120. Power from the rotor shaft 106 is transmitted, e.g., first to a planet carrier 112 of the first epicyclic gearing 110, and then via a shaft 116 to the planet carrier 122 of the second epicyclic gearing 120. Both epicyclic gearings 110 and 120 are configured to give constant step-up ratios so that the speed of rotation gradually increases from the rotor shaft 106 at the input of the constant ratio gearbox 130 to the interconnecting shaft 126 at the output of the constant ratio gearbox 130. In other embodiments, the constant ratio gearbox 130 may include additional or fewer gears configured in a different way to transmit power from the rotor shaft 106 to the interconnecting shaft 126.

The interconnecting shaft 126 connects the torque output of the constant ratio gearbox 130 to a torque input of the variable-ratio gear system 906, 802. The variable-ratio gear system 906, 802 functions as a superposition gear having a mechanical component 906 and a hydraulic component 802. The mechanical component 906 includes a spur gear 140 driven by the interconnecting shaft 126. The spur gear 140 meshes with a pinion 142 and transmits power via a shaft 144 to a third epicyclic gearing 150. The shaft 144 is rotatably held by a bearing 942 resting on a rigid support 944, which is e.g. attached to a housing (not shown) of the wind energy converter 800, such as a nacelle rotatably disposed on a tower.

The third epicyclic gearing 150 driven by the shaft 144 has three basic components: a planet carrier 940 carrying a set of planet gears 932, an annulus 928, and a sun gear 934. The planet carrier 940 receives input from the shaft 144 and thus rotates at a speed proportional to the speed of the rotor 102. The annulus 928 of the third epicyclic gearing 150 is coupled to the generator 104 via an output shaft 158 of the variable ratio gear system 906, 802, and rotates at the same speed as the generator 104.

The sun gear 934 of the third epicyclic gearing 150 is connected to a sun gear 912 of a fourth epicyclic gearing 910 via a spur gear 162 and a pinion 166. In addition to the sun gear 912, the fourth epicyclic gearing 910 includes a planet carrier 916 carrying planet gears 920 and an annulus 918 as basic components. The annulus 918 of the fourth epicyclic gearing 910 is connected to the shaft 144 and thus also to the planet carrier 940 of the third epicyclic gearing 150 via a further pinion 924 mashing with a further spur gear 926. Thus, the annulus 918 rotates at a speed proportional to the speed of the rotor 102.

The sun gear 912 of the fourth epicyclic gearing 910 is furthermore connected to a first shaft 168 coupled to a first hydraulic unit 174 of the hydraulic component 802 of the variable ratio gear system 906, 802. The hydraulic component 802 furthermore includes a second hydraulic unit 172 and hydraulic conduits 176, 178 interconnecting the first 174 and second 172 hydraulic units, thereby forming a hydraulic circuit 174, 176, 172, 178 in which power is transferable between the hydraulic units 174, 172 by a circulating hydraulic fluid. The second hydraulic unit 172 is coupled to a second shaft 165, which is connected via a pinion 922 and a spur gear 914 to the planet carrier 916 of the fourth epicyclic gearing 910. Both hydraulic units 174, 172 have a respective swash plate 174a, 172a with a respective controllable swivel angle. For example, the hydraulic units 174, 172 are hydraulic motors or pumps such as axial piston pumps. Each hydraulic unit performs a conversion between the rotational motion of a respective one of the first 168 and second 165 shafts and the hydraulic flow through the hydraulic circuit 174, 176, 172, 178.

The setting of the swivel angle of the swash plate 174a of the first hydraulic unit 174 sets the relationship between an amount Q of the hydraulic fluid flowing through a cross section of the hydraulic circuit 174, 176, 172, 178 (e.g., a cross section of one of the hydraulic conduits 176, 178) during a given time span and an angular distance $\theta_1$ through which the first shaft 168 rotates during the same time span. Similarly, the swivel angle of the swash plate 172a of the second hydraulic unit 172 sets the relationship between the amount Q of hydraulic fluid flowing through a cross section of the hydraulic circuit 174, 176, 172, 178 and an angular distance $\theta_2$ through which the second shaft 165 rotates during a corresponding time span. Therefore, the hydraulic component 802 of the variable-ratio gear system 906, 802 functions as an infinitely variable gear system in which torque (and thus power) is transmitted between the first 168 and second 165 shafts. The direction and amount of the power transmitted between the shafts can be controlled by the setting of the swivel angles of the swash plates 174a, 172a.

The variable-ratio gear system 906, 802 as shown in FIG. 1 functions as a superposition gear system in which two additional torque paths are superimposed upon a main torque path that connects the output of the constant ratio gearbox 130 to the input of the generator 104. The main torque path includes the interconnecting shaft 126, the spur gear 140, the pinion 142, and the planet gears 932 and annulus 928 of the third epicyclic gearing 150.

The first superimposed torque path branches off the main torque path at the shaft 144 and leads through the spur gear 926, the pinion 924, the fourth epicyclic gearing 910, the pinion 166, the spur gear 162 and the sun gear 934 of the third epicyclic gearing 150 before rejoining the main torque path at the planet gears 932 of the third epicyclic gearing 150.

The second superimposed torque path branches off the first superimposed torque path at the planet gears 920 of the fourth epicyclic gearing 910 and leads through the spur gear 914, the pinion 922, and the second shaft 165 coupled to the second hydraulic unit 172 where the torque on the second shaft 165 is converted into a hydraulic flow through the hydraulic conduits 176, 178. After the hydraulic flow is re-converted by the first hydraulic unit 174 into a torque on the first shaft 168, the second superimposed torque path continues through the first shaft 168 to the pinion 166 where it rejoins the first superimposed torque path.

In the example of FIG. 1, the variable-ratio gear system 906, 802 functions as a superposition gear system having at least two superimposed torque paths in addition to a main torque path, wherein one of the superimposed torque paths includes a hydraulic circuit having at least a first and a second hydraulic unit hydraulically interconnected.

Figure 2A:
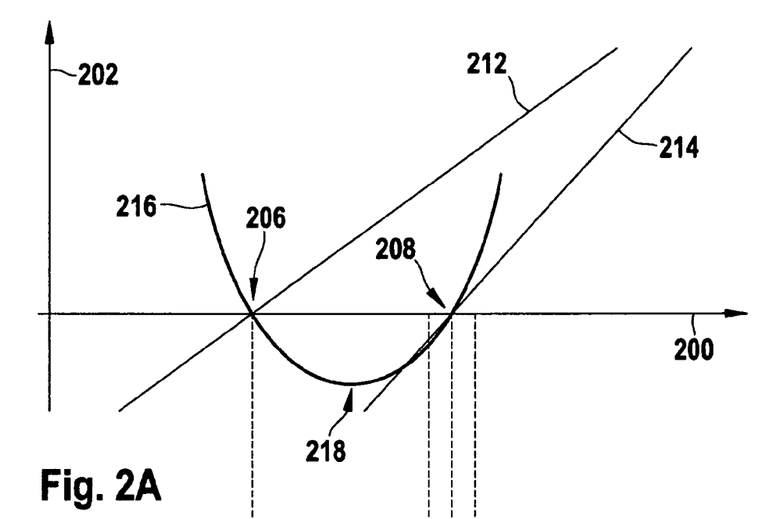
FIG. 2A is a schematic diagram showing, for the wind energy converter of FIG. 1, a rotational speed of a first shaft, a rotational speed of a second shaft, and an amount of power transferred between the hydraulic units as functions of the rotor speed.
Figure 2B:
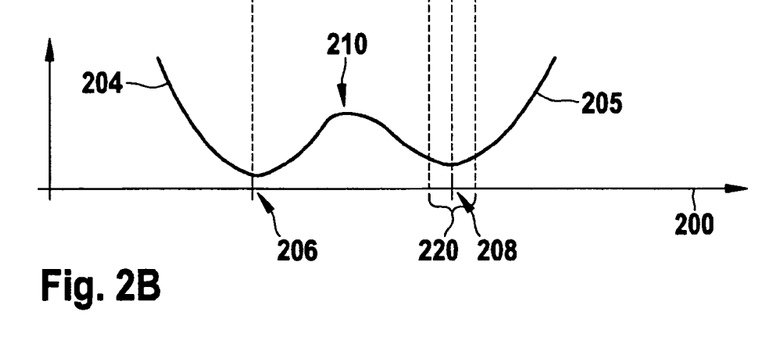
FIG. 2B is a schematic diagram showing, for the wind energy converter of FIG. 2A, a hydraulic power loss in the hydraulic units as a function of the rotor speed.

FIGS. 2A and 2B illustrate the operation of this variable-ratio gear system 906, 802 in detail, assuming that the generator 104 is driven at a substantially constant speed by the output of the variable-ratio gear system 906, 802.

In FIG. 2A, a horizontal axis represents the rotational speed 200 of the rotor 102 of the wind energy converter. Based on the assumption of constant generator speed, the rotor speed 200 is directly—proportionally or inversely, according to definition—related to the gear ratio of the variable-ratio gear system 906, 802, which is controllable via the settings of the hydraulic units 172 and 174, e.g. the combined settings of the swivel angles of the hydraulic units.

In this figure, three variables are shown as functions of the rotor speed 200, each in arbitrary units along a common vertical axis 202. The three variables include a rotational speed 214 of the first hydraulic unit 174, a rotational speed 212 of the second hydraulic unit 172, and an amount of power 216 transferred hydraulically between the two hydraulic units. For each hydraulic unit, the respective rotational speed 212, 214 shows a near linear relationship to the rotor speed 200.

The rotational speed 214 of the first hydraulic unit crosses the horizontal axis 200, i.e. changes its rotational direction, at an upper zero point 208 of the variable-ratio gear system. Likewise, the rotational speed 212 of the second hydraulic unit crosses the horizontal axis 200, i.e. changes its rotational direction, at a lower zero point 206 of the superposition gear system. Here, the respective correspondence of the first and second hydraulic unit to the upper 208 and lower 206 zero points has been chosen arbitrarily purely for illustrative reasons. The power 216 transferred between the hydraulic units reverses direction at both the lower 206 and upper 208 zero points, and it exhibits a local minimum 218 in terms of its absolute amount approximately midway between the lower 206 and upper 208 zero points.

FIG. 2B shows the amount of hydraulic power loss 205 as a function of rotor speed for the variable-ratio gear system 906, 802 of FIG. 1 operating in the same range of rotor speed 200 as in FIG. 2A. The hydraulic power loss 205 is seen to exhibit a respective local minimum at each of the lower 206 and upper 208 zero points. Due to leakage flow etc. in the hydraulic units, the power loss is still greater than zero at the zero points 206, 208.

Figure 3:
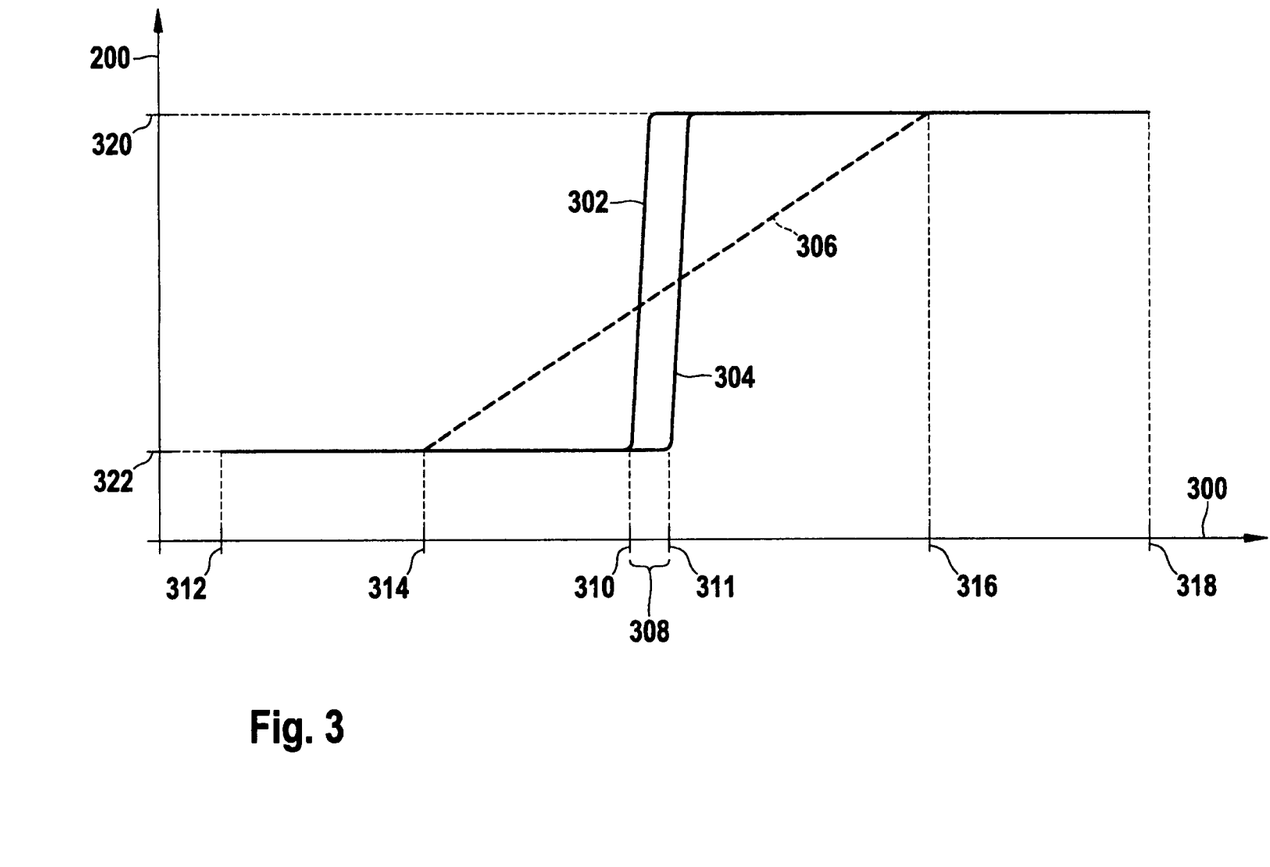
FIG. 3 is a schematic diagram showing, for a wind energy converter operated according to a method of an embodiment, a dependency of the rotor speed on the speed of wind.

FIG. 3 illustrates a method of operating a wind energy converter of the aforementioned kind under conditions of changing wind speed. Above a horizontal axis representing the wind speed 300, which is assumed to fluctuate arbitrarily, solid curves 302, 304 represent the way by which the rotational speed of the rotor 200 is adjusted according to the wind speed 300. Herein, the first solid curve 304 applies to a situation where the wind speed 300 rises, whereas the second solid curve 302 applies to a situation where the wind speed 300 falls.

In this example, when the wind speed 300 is below a first threshold value 310, the rotor speed 200 (as shown by both curves 302, 304) is fixed at a lower rotor speed limit 322 that corresponds to the lower zero point 206 as shown in FIGS. 2A-B. Preferably, the lower rotor speed limit 322 also corresponds to a minimum operational speed at which the wind energy converter is capable of producing electricity. When the wind speed 300 is above a second threshold value 311, the rotor speed 200 (as shown by both curves 302, 304) is fixed at an upper rotor speed limit 320 that corresponds to the upper zero point 208 as shown in FIGS. 2A-B. Preferably, the upper rotor speed limit 320 also corresponds to a maximum operational speed at which the wind energy converter is capable of producing electricity, such as a nominal operation speed at which the rotor can safely operate.

If the wind speed 300 starts at a level above the first threshold value 310 and then falls below it, the gear ratio of the variable-ratio gear system 906, 802 is adjusted such that the rotor speed 200 falls to the lower rotor speed limit 322, as shown by the second solid curve 302. If the wind speed 300 starts at a level below the second threshold value 311 and then rises beyond it, the gear ratio of the variable-ratio gear system is adjusted such that the rotor speed 200 rises to the upper rotor speed limit 320, as shown by the first solid curve 304.

In this example, the gear ratio is adjusted only when the wind speed 300 crosses the threshold values 310, 311, causing the rotor speed 200 to change, for example, from the lower rotor speed limit 322 to the upper rotor speed limit 320, or in the reverse direction. Note that the upper rotor speed limit 320 and lower rotor speed limit 322 respectively correspond to the zero points 206, 208 of the variable-ratio gear system as shown in FIGS. 2A-B, and the variable-ratio gear system passes gear ratios corresponding to the region of the local maximum 210 of the hydraulic losses only transitionally. Thus, the hydraulic losses averaged over a given time interval of operation, such as one day, are lower than e.g. in an alternative method of operation illustrated by a dashed line 306, where within a predefined wind speed interval 314, 316 the rotor speed 200 is continuously regulated according to the wind speed 300 to minimize aerodynamic losses of the rotor. Using typical rotors and hydraulic units, the reduction in hydraulic power losses according to the method of the solid curves 302, 304 generally outweighs the increase in aerodynamic power losses compared e.g. to the method of operation illustrated by the dashed line 306.

Together, the threshold values 310, 311 enclose a hysteresis region 308 that ensures that the frequency at which the rotor speed (and therefore the gear ratio) is adjusted between the upper 320 and lower 322 rotor speed limits is kept low. In other embodiments, the first 310 and second 311 threshold values are configured to be equal.

Referring now back to FIG. 1, in order to control the speed of the rotor 102, for example, according to the method described above with reference to FIG. 3, the wind energy converter 800 further includes a control device 190 for controlling the swivel angles of the swash plates 174a, 172a of the first 174 and second 172 hydraulic units. The control device 190 includes a sensor system 902 that obtains measurements of a local wind condition. In some examples, the sensor system 902 may include a wind speed determiner, which continuously determines the current wind speed by means of a measuring signal received from an anemometer 900. Furthermore, the control device 190 includes a threshold detector 904, which monitors the wind speed obtained from the wind speed determiner 902 and detects when the wind speed rises above and/or falls below a predefined threshold value. Different threshold values may be predefined for falling and rising wind speed in alternative embodiments. In some other examples, the sensor system 902 may additionally or alternatively measure parameters characterizing the operational state of the wind energy converter 800, such as rotor speed n, power P, and hydraulic pressure p. These parameters may also be used by the control device 190 for adjusting the gear ratio of the variable-ratio gear system 906, 802.

In this example, the control device 190 includes a first control unit 192 connected to the threshold detector 904. When the wind speed has risen beyond the threshold value, the first control unit 192 adjusts the variable-ratio gear system 906, 802 to a first gear ratio at which the first shaft 168 substantially does not rotate. The control device 190 further includes a second control unit 194 likewise connected to the threshold detector 904. When the wind speed has fallen beyond the threshold value, the second control unit 194 adjusts the variable-ratio gear system 906, 802 to a second gear ratio at which the second shaft 165 substantially does not rotate.

Figure 4:
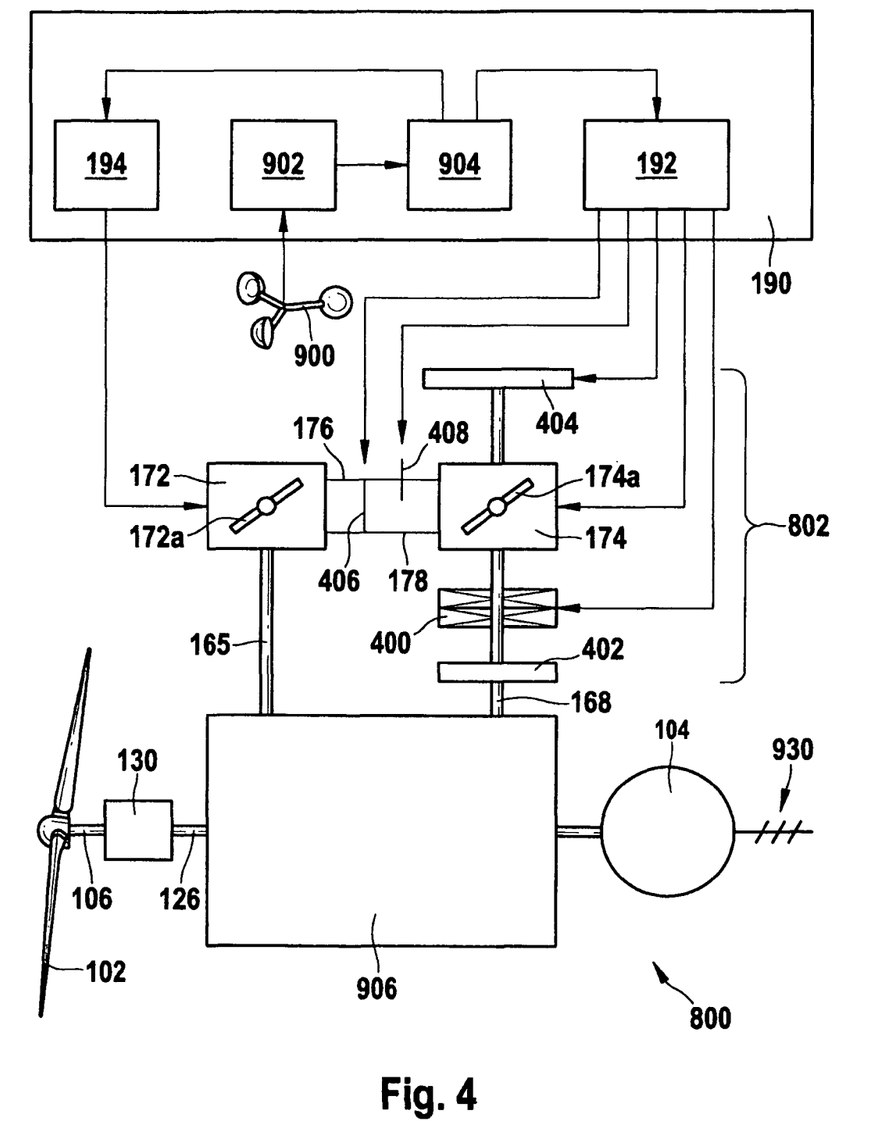
FIG. 4 is a schematic illustration of a wind energy converter according to a further embodiment.

FIG. 4 is a schematic illustration of a wind energy converter 800 according to a further embodiment. Compared with the wind energy converter of FIG. 1, in this example, a clutch 400 is disposed between the first hydraulic unit 174 and the first shaft 168, which connects—in an operational condition where the clutch 400 is closed—the first hydraulic unit 174 to the mechanical component 906 of the variable-ratio gear system 906, 802. The clutch 400 is connected to the first control unit 192, which is configured to uncouple the first shaft 168 from the first hydraulic unit 174 when the threshold detector 904 has detected that the wind speed has fallen below the threshold value.

The wind energy converter 800 further includes a brake 404 for braking the first hydraulic unit 174. The brake 404 is connected to the first control unit 192, which is configured to brake the first hydraulic unit 174 together with uncoupling the first shaft 168 from the first hydraulic unit 174. In alternative embodiments, the clutch 400 and the brake 404 may be combined in the form of a double clutch switchable between a first clutch position in which the first hydraulic unit 174 is coupled to the first shaft 168, and a second clutch position in which the first hydraulic unit is coupled to a rigid support such as a housing of the variable-ratio gear system 906, 802, thereby effectively braking the first hydraulic unit 174.

A security brake 402 is provided for braking the first shaft 168 in the event of any of the hydraulic units 174, 172 becoming inoperative, e.g. when hydraulic fluid is lost in the event of a break of one of the hydraulic conduits 176, 178. In alternative embodiments, the brake 404 is configured to be activated by a security brake activator (not shown) in the event of any hydraulic unit 174, 174 becoming inoperative, such that a separate security brake 402 is not needed. In some implementations, the activation of the security brake 402 is always performed in combination with the opening of a hydraulic bypass 406 between the hydraulic conduits 176 and 178.

The wind energy converter 800 further includes a faceplate 408 or valve for at least partially blocking the one of the hydraulic conduits 176, 178, e.g. when the hydraulic conduit 176 conducting the hydraulic fluid is under high pressure. The brake 404 is connected to the first control unit 192, which is configured to shut the faceplate 408 together with brake 404 braking the first hydraulic unit 174 and the first shaft 168 being uncoupled from the first hydraulic unit 174. Furthermore, the wind energy converter 800 includes a bypass 406 that interconnects at least one hydraulic conduit on the side of the second hydraulic unit relative to the faceplate 408. The bypass 406 is connected to the first control unit 192, which is configured to open the bypass 406 at least partially together with shutting the faceplate 408.

The first control unit 192 may further be configured to regulate the bypass 406 for dampening torque variations such that the gear ratio of the variable-ratio gear system 906, 802 is allowed to dynamically vary within a limited interval around the respective zero point, such as the interval 220 shown in FIGS. 2A-B, which includes the upper zero point 208 and has a width that is small compared to the distance between the lower 206 and the upper 208 zero point. For example, the rotor 102 may in this way be operated at a nearly fixed speed close the lower zero point 206 of the variable-ratio gear system 906, 802, while allowing the gear ratio to be regulated in a confined gear-ratio interval 220 close to the upper zero point 208, in order to protect the rotor by dampening torque variations at the rotor close to its nominal maximum speed.

Although the present invention has been described with reference to embodiments, it is not limited thereto, but can be modified in various manners which are obvious for a person skilled in the art.

In particular, the respective association of the first and second hydraulic units with the lower and upper zero points, and with features such as gear-ratio intervals, clutches, brakes, bypasses etc. in the above description may be reversed, or such features be provided in association with both hydraulic units.

The general techniques described above can be applied to a variety of variable rotor speed/constant generator speed drive trains with a variable ratio gear system controlled by an infinitely variable gear, in particular by a hydrostatic circuit consisting of two hydraulic units connected by two pressure lines. The general techniques can also be applied to an infinitely variable gear system controlled by a hydrodynamic circuit (e.g., a VOITH system). Other embodiments are within the scope of the following claims.

The invention claimed is:

1. A method for operating a wind energy converter having a variable-ratio gear system mechanically coupled between
   a rotor and
   a generator,
the variable-ratio gear system including
   a first transmission unit coupled to a first shaft and
   a second transmission unit coupled to a second shaft,
the method comprising:
   adjusting the variable-ratio gear system to a first gear ratio at which the first shaft substantially does not rotate;
   determining a wind speed or a related parameter;
   detecting whether the wind speed or the related parameter has crossed a first threshold value in a first direction; and
   adjusting the variable-ratio gear system, when the wind speed has crossed the first threshold value in the first direction, to a second gear ratio at which the second shaft substantially does not rotate.

2. The method of claim 1, wherein the first and second transmission units comprise a first and a second hydraulic unit.

3. The method of claim 2, wherein at least one of the first gear ratio and the second gear ratio corresponds to one of a minimum operational speed and a nominal maximum speed of the rotor.

4. The method of claim 2, further comprising uncoupling the first shaft from the first hydraulic unit when the wind speed or the related parameter has crossed the first threshold value in the first direction.

5. The method of claim 4, further comprising braking the first hydraulic unit when the wind speed or the related parameter has crossed the first threshold value in the first direction.

6. The method of claim 5, further comprising adjusting a swivel angle of the first hydraulic unit to substantially stop a hydraulic flow through the first hydraulic unit.

7. The method of claim 4, wherein the first and second hydraulic unit are connected by at least one hydraulic conduit, the method further comprising blocking the at least one hydraulic conduit when the wind speed or the related parameter has crossed the first threshold value in the first direction.

8. The method of claim 2, further comprising:
  detecting whether the wind speed or the related parameter has crossed a second threshold value in a direction opposite to the first direction; and
  adjusting the variable-ratio gear system, when the wind speed or the related parameter has crossed the second threshold value in a direction opposite to the first direction, to the first gear ratio.

9. The method of claim 8, further comprising uncoupling the second shaft from the second hydraulic unit when the wind speed or the related parameter has crossed the second threshold value in a direction opposite to the first direction.

10. The method of claim 9, further comprising braking the second hydraulic unit when the wind speed or the related parameter has crossed the second threshold value in a direction opposite to the first direction.

11. A wind energy converter comprising:
  a rotor;
  a generator;
  a variable-ratio gear system mechanically coupled between the rotor and the generator, the variable-ratio gear system including
    a first transmission unit coupled to a first shaft and
    a second transmission unit coupled to a second shaft;
  a first control unit, which is arranged to adjust the variable-ratio gear system to a first gear ratio at which the first shaft substantially does not rotate;
  a wind speed determiner, which is arranged to determine a wind speed or a related parameter;
  a threshold detector, which is arranged to detect whether the wind speed or the related parameter has crossed a first threshold value in a first direction; and
  a second control unit, which is arranged to adjust the variable-ratio gear system to a second gear ratio at which the second shaft substantially does not rotate, when the wind speed or the related parameter has crossed the first threshold value in the second direction.

12. The wind energy converter of claim 11, wherein
  the generator is a constant-speed generator, and
  the variable-ratio gear system is configured such that at least one of the first gear ratio and the second gear ratio corresponds to one of a minimum operational speed and a nominal maximum speed of the rotor.

13. The wind energy converter of claim 11, further comprising
  a clutch for uncoupling the first shaft from the first transmission unit when the wind speed or the related parameter has crossed the first threshold value in the first direction.

14. The wind energy converter of claim 13, wherein the clutch is a double clutch comprising
  a first clutch position configured to couple the first shaft to the first transmission unit, and
  a second clutch position configured to brake the first transmission unit.

15. The wind energy converter of claim 13, further comprising
  a brake for braking the first transmission unit when the wind speed or the related parameter has crossed the first threshold value in the first direction.

16. The wind energy converter of claim 15, further comprising
  a safety brake activator arranged to activate the brake in an event of the first or the second transmission unit becoming inoperational along with activating a bypass.

17. The wind energy converter of claim 13, wherein the first and second transmission units comprise first and second hydraulic units.

18. The wind energy converter of claim 17, further comprising:
  at least one hydraulic conduit connecting the first and second hydraulic unit; and
  a valve for blocking the at least one hydraulic conduit when the wind speed or the related parameter has crossed the first threshold value in the first direction.

19. The wind energy converter of claim 18, further comprising a bypass that interconnects the at least one hydraulic conduit.

* * * * *